(12) United States Patent
Yang et al.

(10) Patent No.: US 11,829,031 B1
(45) Date of Patent: Nov. 28, 2023

(54) MULTILAYER LIGHT DIFFUSER PLATE AND METHOD FOR MANUFACTURING THE SAME

(71) Applicant: Entire Technology Co., Ltd., Taoyuan (TW)

(72) Inventors: Chih Wen Yang, Taoyuan (TW); Yu Wei Chang, Taoyuan (TW); Mao Hsing Lin, Taoyuan (TW)

(73) Assignee: Entire Technology Co. Ltd.

( * ) Notice: Subject to any disclaimer, the term of this patent is extended or adjusted under 35 U.S.C. 154(b) by 0 days.

(21) Appl. No.: 17/880,984

(22) Filed: Aug. 4, 2022

(30) Foreign Application Priority Data

May 20, 2022 (TW) .................................. 111118965

(51) Int. Cl.
*G02F 1/13357* (2006.01)
*G02F 1/1335* (2006.01)
(Continued)

(52) U.S. Cl.
CPC .. *G02F 1/133606* (2013.01); *B29D 11/00798* (2013.01); *G02B 5/0215* (2013.01); *G02B 5/0242* (2013.01); *G02B 5/0268* (2013.01); *G02B 5/0289* (2013.01); *G02F 1/133603* (2013.01); *G02F 1/133614* (2021.01)

(58) Field of Classification Search
CPC ......... G02F 1/133606; G02F 1/133603; G02F 1/133614; B29D 11/00798; G02B 5/0215; G02B 5/0242; G02B 5/0268; G02B 5/0289

See application file for complete search history.

(56) References Cited

U.S. PATENT DOCUMENTS

| | | | |
|---|---|---|---|
| 6,437,048 B1 * | 8/2002 | Saito | C08L 23/10 525/320 |
| 2007/0134438 A1 * | 6/2007 | Fabick | G02B 5/0247 428/1.1 |

FOREIGN PATENT DOCUMENTS

| | | | | |
|---|---|---|---|---|
| CN | 108303821 A | * | 7/2018 | ............. G02B 6/005 |
| CN | 108538875 A | * | 9/2018 | ............. H01L 27/156 |

(Continued)

OTHER PUBLICATIONS

English Machine Translation of Zhao et al CN 108 538 875 (Year: 2023).*

(Continued)

*Primary Examiner* — Donald L Raleigh

(57) ABSTRACT

A multilayer light diffuser plate and a method for manufacturing the same are disclosed. The multilayer light diffusion plate comprises a main layer and a partially-transmissive and partially-reflective layer located under the main layer. The top surface of the main layer is the light-emitting surface, and the light-incident surface is the bottom surface of the partially-transmissive and partially-reflective layer. The partially-transmissive and partially-reflective layer comprises a plurality of first base material layers and a plurality of second base material layers stacked alternately. The materials of the first and second base material layers have different refractive indices. The partially-transmissive and partially-reflective layer formed by alternately stacking the first and second base material layers with different refractive indices is arranged on the light-incident surface of the light diffuser plate by means of extrusion, which is simpler and less expensive to manufacture.

14 Claims, 10 Drawing Sheets

(51) Int. Cl.
*B29D 11/00* (2006.01)
*G02B 5/02* (2006.01)

(56) References Cited

FOREIGN PATENT DOCUMENTS

| KR | 20130015271 A | * | 2/2013 | ........... G02F 1/1335 |
| KR | 20160066890 A | * | 6/2016 | ............... G09F 7/04 |

OTHER PUBLICATIONS

English Machine Translation of Kwon, KR 2016/006 6890 (Year: 2023).*
English Machine Translation of Chang CN 108 303 821 (Year: 2023).*
English Machine Translation of Lee KR 2013/001 5271 (Year: 2023).*

* cited by examiner

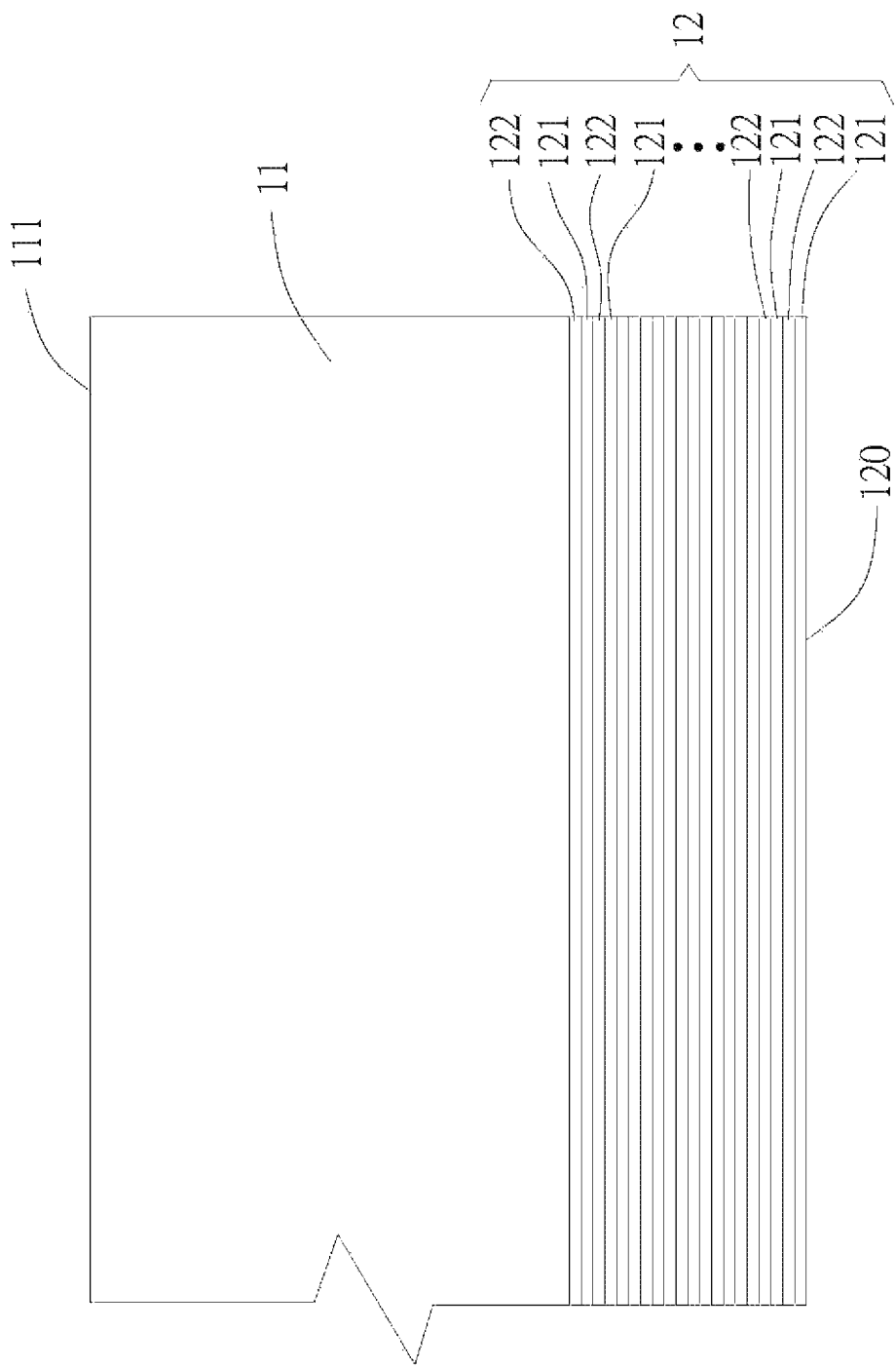

| | A | B | C | D |
|---|---|---|---|---|
| Transmittance % | 20 | 40 | 60 | 80 |
| Reflection % | 75 | 60 | 30 | 15 |
| FOS |  | 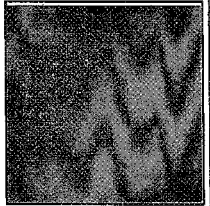 |  | 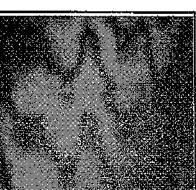 |
| 5 best → 1 worse | 3.5 | 5 | 5 | 3.5 |
FIG.9

MULTILAYER LIGHT DIFFUSER PLATE AND METHOD FOR MANUFACTURING THE SAME

This application claims the benefit of Taiwan Patent Application Serial No. 111118965 filed May 20, 2022, the subject matter of which is incorporated herein by reference.

BACKGROUND OF INVENTION

1. Field of the Invention

The present invention refers to a multilayer light diffuser plate applied to a direct-type backlight module and a method for making the same, especially refers to a multilayer light diffuser plate which is provided with a partially-transmissive and partially-reflective layer formed by alternately stacking a plurality of first base material layers and second base material layers with different refractive indices on the light-incident surface of the light diffuser plate.

2. Description of the Prior Art

At present, more and more liquid-crystal display (LCD) devices use direct-type backlight modules to provide the light source of their liquid-crystal panels. Conventional direct-type backlight modules generally use a light source module equipped with light-emitting diodes (LEDs) disposed on the bottom side of the direct-type backlight modules to provide the light required. The light emitted by the LEDs is homogenized by a light diffuser plate and then emitted out from a light-emitting surface on the top side upward, so as to improve the bright and dark bands (MURA) phenomenon of the light-emitting surface of the light diffuser plate.

The conventional light diffuser plate mainly provides the light diffusing function in the following ways:

(1) Adding a number of tiny diffusing particles inside the light diffuser plate. The effect of refraction, reflection or scattering of light is achieved by the different refractive indices of the materials of the diffusing particles and the light diffuser plate, so as to diffuse the light. In order to achieve a good uniform light diffusing effect, it is necessary to increase the amount of diffusing particles added to reduce the light transmittance, or increase the distance between the light diffuser plate and the LED light source module; however, these practices will reduce the light utilization rate or increase the overall thickness of the backlight module.

(2) Adding a plurality of microstructures on the surface of the light diffuser. Use surface microstructures to change the direction of light travel, so as to provide the function of light diffusion. Due to the use of the extrusion process, a good transfer rate cannot be obtained, thereby reducing the effect of the microstructures to change the direction of light.

(3) Printing a plurality of dots on the surface of the light diffuser plate. The surface printing dots are used to diffuse/shade different positions on the surface of the light diffuser plate, thereby reducing the bright and dark bands between the LEDs on the light emitting surface. However, multiple processing steps are required for printing dots, and there is an assembly alignment problem.

As can be seen from the above, in order to achieve the light diffusion effect, the currently known light diffuser plate technologies are mainly to add light diffusing particles to the light diffuser plate composed of thermoplastic materials, to extrude surface microstructures by rollers, or to print dots on the surface of the light diffuser plate. However, these technologies have limited diffusion effects and have the following disadvantages: need to increase the thickness of the diffuser plate, or reduce the penetration rate of the diffuser plate, or increase the distance between the LEDs and the diffuser plate, or increase the number of steps for multiple processing and have assembly alignment problems . . . etc., and thus still need to be improved.

In the present invention, a partially-transmissive and partially-reflective layer is arranged on the surface of the light diffuser plate to partially penetrate and partially reflect the intensity of the linear light source above the LEDs. In this way, the bright and dark bands between the LEDs are reduced in order to achieve the uniform light-diffusing effect. The partially-transmissive and partially-reflective layer of the prior art can be obtained by coating/electroplating methods, but requires subsequent processing, which is complicated and expensive. In contrast, in the present invention, by means of extrusion molding, the light-incident surface of the light diffuser plate is provided with the partially-transmissive and partially-reflective layer by alternately stacking a plurality of first base material layers and second base material layers with different refractive indices, which can solve the problems of complicated process and high cost of conventional coating/electroplating methods for making the partially-transmissive and partially-reflective layer.

SUMMARY OF THE INVENTION

The primary objective of the invention is to provide a multilayer light diffuser plate and a method for manufacturing the same. The multilayer light diffusion plate comprises a main layer and a partially-transmissive and partially-reflective layer. The light-emitting surface of the multilayer light diffusion plate is the top surface of the main layer, and the light-incident surface is the bottom surface of the partially-transmissive and partially-reflective layer. The partially-transmissive and partially-reflective layer is located under the main layer and is composed of a plurality of first base material layers and a plurality of second base material layers stacked alternately. The materials of the first base material layer and the second base material layer have different refractive indices. The light-incident surface of the light diffuser plate is provided with the partially-transmissive and partially-reflective layer, which can partially penetrate and partially reflect the intensity of the linear light source of the LED light source module below, thereby reducing the bright and dark bands (MURA) between the LEDs and achieving the effect of uniform light. In addition, the partially-transmissive and partially-reflective layer formed by alternately stacking a plurality of first base material layers and second base material layers with different refractive indices is arranged on the light-incident surface of the light diffuser plate by means of extrusion, which is simpler and less expensive to manufacture.

In order to achieve the aforementioned objective, the present invention provides a multilayer light diffuser plate capable of being assembled on a light source module. The multilayer light diffuser plate has a light-incident surface and a light-emitting surface that are parallel to each other. A distance between the light-incident surface and the light-emitting surface is a thickness of the multilayer light diffuser plate. The light-incident surface is adjacent to the light source module, so that the light emitted from the light source module can enter the multilayer light diffuser plate through the light-incident surface and travel substantially along a thickness direction. The multilayer light diffuser plate comprises: a main layer and a partially-transmissive and partially-reflective layer located below the main layer. The light-emitting surface is located on a top surface of the main layer. The light-incident surface is located on a bottom surface of the partially-transmissive and partially-reflective layer. Wherein, the partially-transmissive and partially-reflective layer comprises a plurality of first base material layers and a plurality of second base material layers stacked alternately. At least one of the upper and lower sides of each of the first base material layers is adjacent to one of the second base material layers. In addition, at least one of the upper and lower sides of each of the second base material layers is adjacent to one of the first base material layers. A material constituting the first base material layers and another material constituting the second base material layers have different refractive indices.

In a preferred embodiment, base materials of the main layer and the partially-transmissive and partially-reflective layer are either non-crystalline or semi-crystalline plasticized materials. A ratio of the thickness of the main layer to the thickness of the partially-transmissive and partially-reflective layer is in the range of 9:1 to 7:3. A number of stacked layers of the partially-transmissive and partially-reflective layer, that is, the sum of the number of layers of the first base material layers and the second base material layers, is between 50 and 400 layers. A ratio of the thickness of the first base material layer to the thickness of the second base material layer is ranged from 3:1 to 1:3.

In a preferred embodiment, the materials of the main layer and the partially-transmissive and partially-reflective layer are respectively selected from one of the following: polycarbonate (PC), polystyrene (PS), polymethyl methacrylate (PMMA, commonly known as acrylic force), polyethylene (PE), polypropylene (PP), and polyethylene terephthalate (PET). The number of stacked layers of the partially-transmissive and partially-reflective layer is between 100 and 400 layers.

In a preferred embodiment, the material of the main layer is polycarbonate (PC); the material of the first base material layers is polycarbonate (PC); the material of the second base material layers is polymethyl methacrylate (PMMA). The thicknesses of the first base material layer and the thicknesses of the second base material layer are the same, that is, the ratio of the thickness of each first base material layer to the thickness of each second base material layer 122 is 1:1. The light source module is an LED light source module comprising a plurality of light-emitting diodes (LEDs) arranged in an array. The thickness of the multilayer light diffuser plate ranges from 1.0 mm to 3.0 mm.

In a preferred embodiment, the multilayer light diffuser plate is made by foam extrusion molding, and the main layer comprises a plurality of microbubbles and a plurality of diffusing particles. A material of the diffusing particles is one of the following: calcium carbonate, silicon dioxide, titanium dioxide, silicone resin microparticles, and polymethyl methacrylate microparticles. A weight percentage of the diffusing particles in the main layer is 0.1%-10%. The microbubbles are distributed in the main layer; due to the difference in refractive indices between air in the microbubbles and the material of the main layer, light traveling in the main layer can be refracted, reflected or scattered by the microbubbles. A weight reduction rate of the microbubbles to the main layer is 15-25%, and an average size of the microbubbles is between 60~800 μm. Wherein, a calculation formula of the weight reduction rate is:

$$\text{weight reduction rate } (\%) = (W1 - W2)/W2 * 100\%;$$

$$W1 = H * (L1 * L2 * D);$$

wherein:
H is the average thickness of the main layer (mm);
L1 is the length of the main layer (mm);
L2 is the width of the main layer (mm);
D is the density of the raw material of the main layer (g/mm$^3$);
W1 is the theoretical weight (g) of the main layer, that is, the weight when the microbubbles are not included;
W2 is the actual weight (g) of the main layer, that is, the actual weight of the plate body containing a plurality of the microbubbles is actually weighed by a scale.

In a preferred embodiment, the multilayer light diffuser plate further comprises a quantum dot layer and a water-blocking and gas-blocking layer. A plurality of microstructures is disposed on the light-emitting surface of the multilayer light diffuser plate in an array form. A plurality of convex portions and a plurality of concave portions are formed on the light-emitting surface by means of the microstructures. The concave portions are separated by the convex portions, so the concave portions are independent and do not communicate with each other. The quantum dot layer is disposed at the concave portions on the light-emitting surface of the light diffuser plate. A thickness of the quantum dot layer is t1, a distance from a top of the convex portions to a bottom of the concave portions is t2, wherein t1<t2. The water-blocking and gas-blocking layer is disposed entirely on the light-emitting surface of the light diffuser plate and is closely adhered to cover the plurality of convex portions and the quantum dot layer. The quantum dot layer comprises a plurality of quantum dots. The quantum dots are nanocrystal semiconductor materials, which are composed of II-VI, III-V or IV-VI group elements. A grain diameter of each of the quantum dots is between 2 nm and 10 nm. Wherein, the quantum dots include a plurality of green quantum dots with light emission wavelengths of 520-530 nm and a plurality of red quantum dots with light emission wavelengths of 620-630 nm. The light source module is a blue light LED light source module formed by a plurality of blue light-emitting diodes (LEDs) arranged in an array.

In a preferred embodiment, the microstructures include a plurality of N-sided pyramids, wherein N is a positive integer greater than or equal to three; t2 is between 6-200 μm; the maximum width of the convex portions is between 50-500 μm; a distance between two adjacent said convex portions is between 50-1000 μm. A thickness of the water-blocking and gas-blocking layer is t3, and t3 is between 5-100 μm. The blue light LED light source module is a sub-millimeter light-emitting diode (Mini LED) array module capable of emitting blue light; a wavelength of the blue light is between 430-500 nm.

In a preferred embodiment, a plurality of said microstructures is disposed on the light-incident surface of the multilayer light diffuser plate in an array form. A plurality of said convex portions and a plurality of said concave portions are formed on the light-incident surface by means of the microstructures.

In order to achieve the aforementioned objective, the present invention provides a method for manufacturing a multilayer light diffuser plate, comprising the following steps:

a step for inserting material, wherein at least a first base material, a second base material, a foaming agent, and a plurality of diffusing particles are put into a foam extrusion molding machine from a feeding port; wherein the first base material and the second base material have different refractive indices;

a step for heating and kneading, wherein, in the foam extrusion molding machine, the inserted materials are uniformly heated, kneaded and foamed at a general processing temperature suitable for polycarbonate; wherein the first base material and the second base material are separately heated and kneaded without mixing;

a step for distributing feed block, wherein, the heated and kneaded first base material and the heated and kneaded second base material are directed to a distributing feed block; by using the distributing feed block, the heated and kneaded first base material is split into a main layer and a plurality of first base material layers, and the heated and kneaded second base material is split into a plurality of second base material layers, and the first base material layers and the second base material layers are alternately stacked to form a partially-transmissive and partially-reflective layer, and moreover, and the partially-transmissive and partially-reflective layer is superimposed on the main layer;

a step for T-Dies, wherein, through a T-die of the foam extrusion molding machine, the uniformly kneaded, foamed and superimposed main layer and the partially-transmissive and partially-reflective layer from the distributing feed block are co-extruded into a one-piece multilayer plastic plate;

a step for rolling, wherein, the one-piece multilayer plastic plate is rolled and cooled through a roller module; and a step for output product, wherein the cooled one-piece multilayer plastic plate is sent out from a discharge port of the foam extrusion molding machine as a product of multilayer light diffuser plate;

wherein the multilayer light diffuser plate sent out from the discharge port has a light-incident surface and a light-emitting surface that are parallel to each other, and a thickness that is perpendicular to the light-incident surface and the light-emitting surface; in addition, the multilayer light diffuser plate comprises the main layer and the partially-transmissive and partially-reflective layer; the light-emitting surface is located on a top surface of the main layer, the partially-transmissive and partially-reflective layer is located below the main layer, and the light-incident surface is located on a bottom surface of the partially-transmissive and partially-reflective layer;

wherein the partially-transmissive and partially-reflective layer comprises the first base material layers and the second base material layers stacked alternately; at least one of the upper and lower sides of each of the first base material layers is adjacent to one of the second base material layers; in addition, at least one of the upper and lower sides of each of the second base material layers is adjacent to one of the first base material layers; a material constituting the first base material layers and another material constituting the second base material layers have different refractive indices.

In a preferred embodiment, wherein, in the step for rolling, the roller module rolls on the one-piece multilayer plastic plate in order to form a plurality of microstructures on a light-emitting surface of the one-piece multilayer plastic plate, so that the microstructures are arranged on the light-emitting surface in an array form. The microstructures form a plurality of convex portions and a plurality of concave portions on the light-emitting surface. The concave portions are separated by the convex portions, so the concave portions are independent and do not communicate with each other. Wherein, the following steps are further included between the step for rolling and the step for output product:

a step for coating a quantum dot layer on the concave portions on the light-emitting surface of the multilayer light diffuser plate by a coating process; a thickness of the quantum dot layer is t1, a distance from a top of the convex portions to a bottom of the concave portions is t2, wherein t1<t2; and a step for sticking a water-blocking and gas-blocking layer onto the light-emitting surface of the multilayer light diffuser plate in order to cover the convex portions and the quantum dot layer. Wherein, the quantum dot layer includes a plurality of quantum dots (QD for short). The multilayer light diffuser plate is used with a blue light submillimeter light-emitting diode light source module comprises a plurality of blue light submillimeter light-emitting diodes (Mini LEDs) arranged in an array.

BRIEF DESCRIPTION OF THE DRAWINGS

The present invention will now be specified with reference to its preferred embodiment illustrated in the drawings, in which:

FIG. 2 is an enlarged schematic diagram of the side view of the multilayer light diffuser plate of the present invention as shown in FIG. 1;

FIG. 9 is a comparison diagram of the tastes of samples A, B, C and D shown in FIG. 8.

DESCRIPTION OF THE PREFERRED EMBODIMENT

The present invention refers to a multilayer light diffuser plate and a method for manufacturing the same. The multilayer light diffusion plate comprises a main layer and a partially-transmissive and partially-reflective layer. The light-emitting surface of the multilayer light diffusion plate is the top surface of the main layer, and the light-incident surface is the bottom surface of the partially-transmissive and partially-reflective layer. The partially-transmissive and partially-reflective layer is located under the main layer and is composed of a plurality of first base material layers and a plurality of second base material layers stacked alternately. The materials of the first base material layer and the second base material layer have different refractive indices. The light-incident surface of the light diffuser plate is provided with the partially-transmissive and partially-reflective layer, which can partially penetrate and partially reflect the intensity of the linear light source of the LED light source module below, thereby reducing the bright and dark bands (MURA) between the LEDs and achieving the effect of uniform light. In addition, the partially-transmissive and partially-reflective layer formed by alternately stacking a plurality of first base material layers and second base material layers with different refractive indices is arranged on the light-incident surface of the light diffuser plate by means of extrusion, which is simpler and less expensive to manufacture.

In order to more clearly describe the quantum dot light diffuser plate and its manufacturing method proposed by the present invention, the following will be described in detail with the accompanying drawings.

Figure 1:
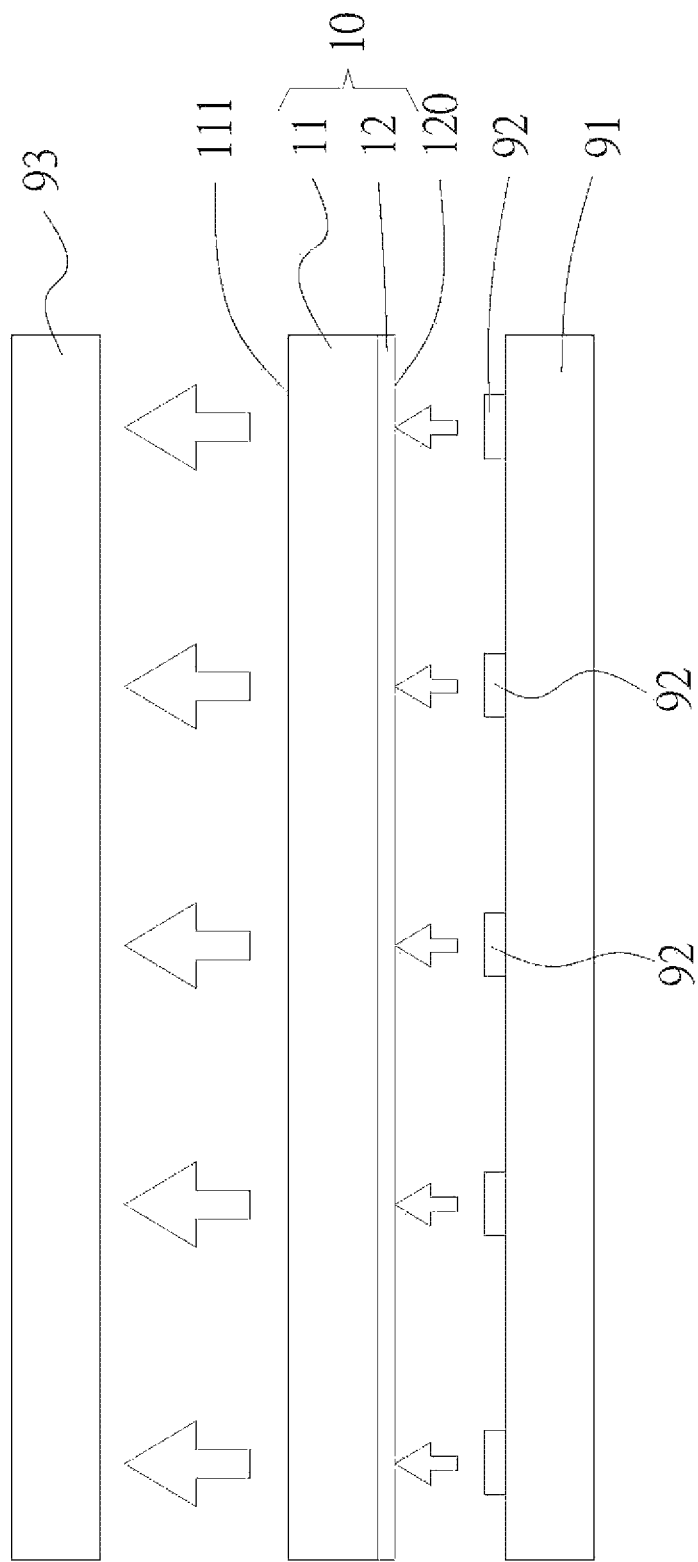
FIG. 1 is a schematic side view of a preferred embodiment of a multilayer light diffuser plate of the present invention combined with an LED light source module to form a white light backlight module disposed under a liquid-crystal display panel (LCD Panel)

Please refer to FIG. 1 and FIG. 2. In which, FIG. 1 is a schematic side view of a preferred embodiment of a multilayer light diffuser plate of the present invention combined with an LED light source module to form a white light backlight module disposed under a liquid-crystal display panel (LCD Panel); FIG. 2 is an enlarged schematic diagram of the side view of the multilayer light diffuser plate of the present invention as shown in FIG. 1.

As shown in FIG. 1 and FIG. 2, The multilayer light diffuser plate 10, the LED (light-emitting diode) light source module located under the multilayer light diffuser plate 10, and the liquid-crystal display panel 93 located above the multilayer light diffuser plate 10 form an LCD display module. The combination of the multilayer light diffuser plate 10 and the LED light source module located below forms a white light backlight module for providing white light to the liquid-crystal display panel 93 located above, so it is a direct-type backlight module. The multilayer light diffuser plate 10 mainly provides the functions of converting the light emitted by the LED light source module into white light, making the light output uniform, or/and enhancing the color gamut of the light output.

In the present invention, The LED light source module is a sub-millimeter light-emitting diode (Mini LED) array module capable of emitting white light or blue light, which comprises a circuit board 91 and a plurality of sub-millimeter light-emitting diodes (LEDs) 92 arranged in an array form on the upper surface of the circuit board 91. In the present embodiment shown in FIG. 1 and FIG. 2, the LED light source module comprises a plurality of white light sub-millimeter light-emitting diodes 92. However, in another embodiment of the present invention, which will be described later, the LED light source module comprises a plurality of blue light sub-millimeter light-emitting diodes 92; wherein, the wavelength of the blue light emitted by each of the sub-millimeter light-emitting diodes 92 is between 430-500 nm, and the grain size thereof is between about 100-200 μm.

The multilayer light diffuser plate 10 has a light-incident surface 120 and a light-emitting surface 111 that are parallel to each other with a relatively large length and width, and a relatively small thickness that is perpendicular to the light-incident surface 120 and the light-emitting surface 111. The light-incident surface 120 is adjacent to or near to the LED light source module, so that the light emitted from the LED light source module upwards can enter the multilayer light diffuser plate 10 through the light-incident surface 120, and travel substantially along the thickness direction, and then emit upward out from the light-emitting surface 111.

The multilayer light diffuser plate 10 comprises a main layer 11 and a partially-transmissive and partially-reflective layer 12. The light-emitting surface 111 is located on a top surface of the main layer 11. The partially-transmissive and partially-reflective layer 12 is located below the main layer 11, and the light-incident surface 120 is located on a bottom surface of the partially-transmissive and partially-reflective layer 12. As shown in FIG. 2, the partially-transmissive and partially-reflective layer 12 is composed of a plurality of first base material layers 121 and a plurality of second base material layers 122 stacked alternately. At least one of the upper and lower sides of each of the first base material layers 121 is adjacent to one of the second base material layers 122; in addition, at least one of the upper and lower sides of each of the second base material layers 122 is adjacent to one of the first base material layers 121. Materials constituting the first base material layers 121 and the second base material layers 122 have different refractive indices. That is, the refractive index of the first base material layers 121 and the refractive index of the second base material layers 122 are different.

The base materials of the main layer 11 and the partially-transmissive and partially-reflective layer 12 of the multilayer light diffuser plate 10 of the present invention can be non-crystalline or semi-crystalline plasticized materials, for example: polycarbonate (PC), polystyrene (PS), polymethyl methacrylate (PMMA, commonly known as acrylic), polyethylene (PE), polypropylene (PP), polyethylene terephthalate (PET), or a copolymer of any of the foregoing materials. The applicable range of the thickness of the multilayer light diffuser plate 10 is 1.0 mm-3.0 mm, and the preferred range of the thickness of the multilayer light diffuser plate 10 is 1.2 mm-2.0 mm. The ratio of the thickness of the main layer 11 to the partially-transmissive and partially-reflective layer 12 is in the range of 9:1 to 7:3. The number of stacked layers of the partially-transmissive and partially-reflective layer 12, that is, the sum of the number of layers of the first base material layers 121 and the second base material layers 122, can be between 50 and 400 layers; however, in the preferred embodiment, the number of stacked layers of the partially-transmissive and partially-reflective layer 12 is between 100 and 400 layers. The applicable range of the ratio of the thickness of the first base material layer 121 to the thickness of the second base material layer 122 is ranged from 3:1 to 1:3. In this embodiment, the material of the main layer 11 is polycarbonate (PC); the material of the first base material layers 121 is polycarbonate (PC); the material of the second base material layers 122 is polymethyl methacrylate (PMMA). In the best embodiment of the present invention, the thicknesses of the first base material layer 121 and the thicknesses of the second base material layer 122 are the same, that is, the ratio of the thickness of each first base material layer 121 to the thickness of each second base material layer 122 is approximately 1:1. Since the materials of the first base material layers 121 and the second base material layers 122 have different refractive indices, therefore, when one hundred or more layers of the first base material layers 121 and the second base material layers 122 are alternately stacked, the light from the light source module below can be partially penetrated and partially reflected by the stacked first and second base material layers 121, 122. With the light reflecting layer disposed on the upper surface of the circuit board 91, the light reflected downward by the partially-transmissive and partially-reflective layer 12 can be reflected again and directed towards the light incident surface 120 of the partially-transmissive and partially-reflective layer 12, so as to achieve the effect of uniform light and reduce the phenomenon of bright and dark bands (MURA).

In the other embodiments of the present invention described below, since the structures, materials and functions of most of the elements are the same or similar to the foregoing embodiments, the same or similar elements will be given the same element names and numbers, and their details will not be repeated.

Figure 3A:
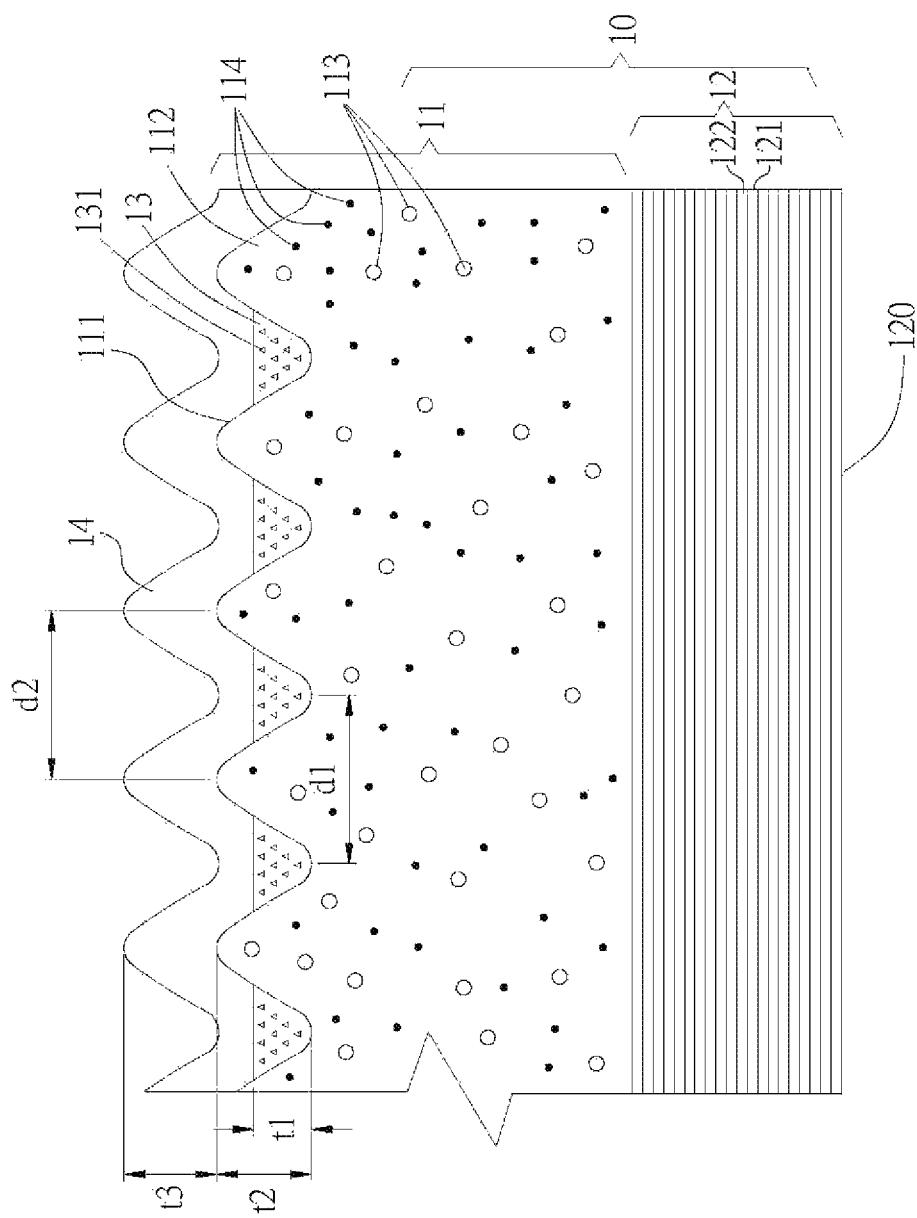
FIG. 3A and FIG. 3B are respectively an enlarged schematic side view of another preferred embodiment of the multilayer light diffuser plate of the present invention, and a schematic diagram of a three-dimensional explosive view of an embodiment of the multilayer light diffuser plate disposed on the LED light source module.
Figure 3B:
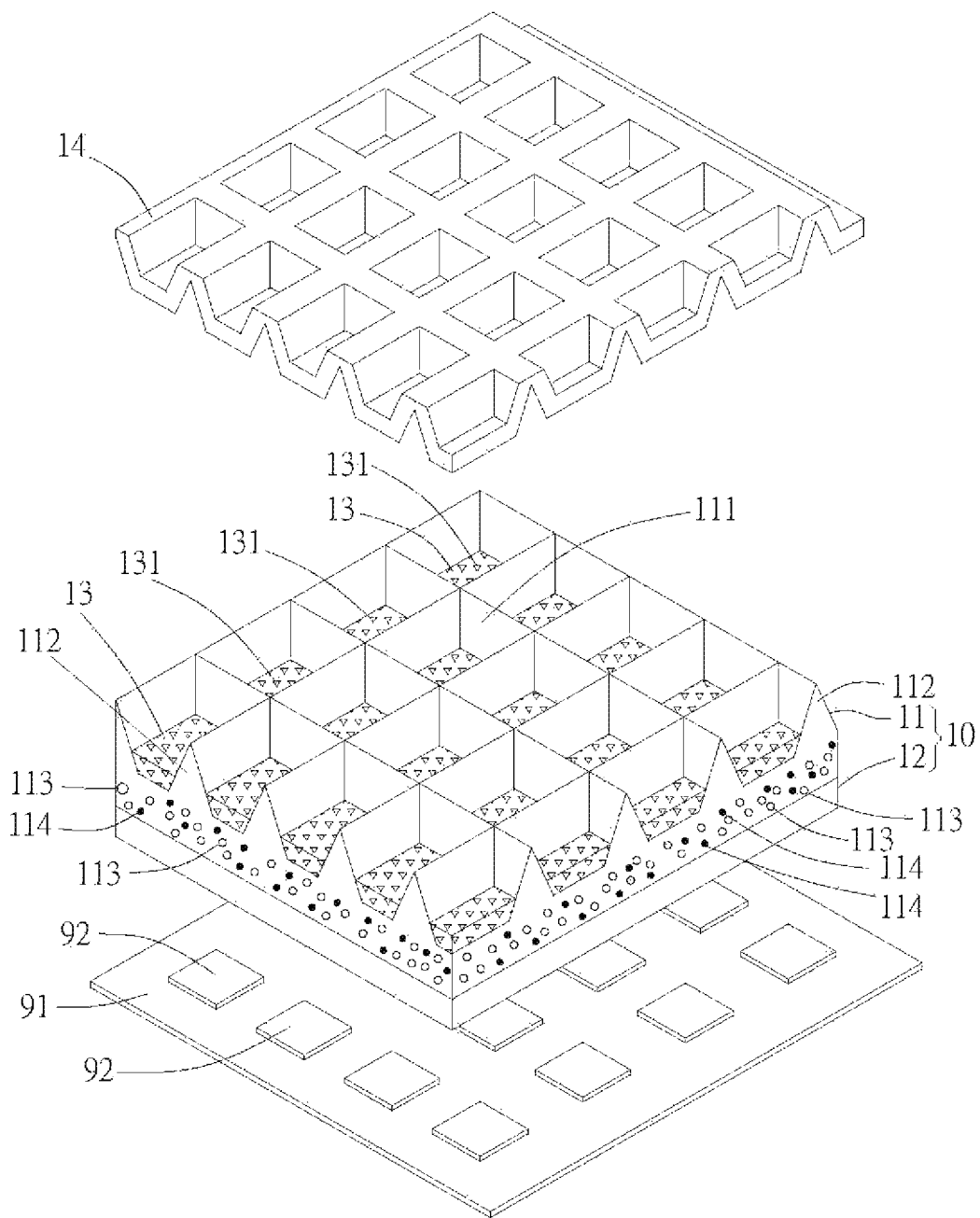

Please refer to FIG. 3A and FIG. 3B, which are respectively an enlarged schematic side view of another preferred embodiment of the multilayer light diffuser plate of the present invention, and a schematic diagram of a three-dimensional explosive view of an embodiment of the multilayer light diffuser plate disposed on the LED light source module.

As shown in FIG. 3A and FIG. 3B, another preferred embodiment of the multilayer light diffuser plate 10 of the present invention also comprises: a main layer 11, a light-emitting surface 111 located on the top surface of the main layer 11, a partially-transmissive and partially-reflective layer 12, and a light incident surface 120 located on the bottom surface of the partially-transmissive and partially-reflective layer 12. The light incident surface 120 of the multilayer light diffuser plate 10 is also adjacent to or near to the light-emitting diodes 92 of the LED light source module. The partially-transmissive and partially-reflective layer 12 also includes at least 50 or more layers (preferably at least 100 or more layers) alternately stacked first base material layers 121 and second base material layers 122. The difference between the present preferred embodiment and the embodiments shown in the aforementioned FIG. 1 and FIG. 2 is that, the multilayer light diffuser plate 10 of the present preferred embodiment shown in FIG. 3A and FIG. 3B further includes the following technical contents and features.

In this embodiment, the multilayer light diffuser plate 10 is made by foam extrusion molding, and the main layer 11 comprises a plurality of microbubbles 113 and a plurality of diffusing particles 114. The material of the plurality of diffusing particles 114 is one of the following: calcium carbonate, silicon dioxide, titanium dioxide, silicone resin microparticles, and polymethyl methacrylate microparticles. The diffusing particles 114 and the main layer 111 have different refractive indices, so that the light traveling in the main layer 11 can be refracted, reflected or scattered by the diffusing particles 114, so as to improve the effect of uniform light output. The weight percentage of the plurality of diffusing particles 114 in the main layer 11 is 0.1%-10%. A plurality of the microbubbles 113 are distributed in the main layer 11. Due to the difference in refractive indices between the air in the microbubbles 113 and the material of the main layer 11, the light traveling in the main layer 11 can be refracted, reflected or scattered by the microbubbles 113, so as to improve the effect of uniform light output.

In this embodiment, the preferred range of the weight reduction rate of the plurality of microbubbles 113 to the main layer 11 is 15-25%, and the average size of the microbubbles 113 is between 60~800 μm. Wherein, the calculation formula of the weight reduction rate is:

weight reduction rate (%)=($W1-W2$)/$W2$*100%;

$W1=H*(L1*L2*D)$;

wherein:
H is the average thickness of the main layer (mm);
L1 is the length of the main layer (mm);
L2 is the width of the main layer (mm);
D is the density of the raw material of the main layer (g/mm$^3$);
W1 is the theoretical weight (g) of the main layer, that is, the weight when the microbubbles are not included;
W2 is the actual weight (g) of the main layer, that is, the actual weight of the plate body containing a plurality of the microbubbles is actually weighed by a scale.

In this embodiment, a plurality of the microbubbles 113 are generated by adding a foaming agent and a nucleating agent in an appropriate amount during the foam extrusion molding process of the main layer 11. In the present invention, the foaming agent can be selected from commercially available conventional high-temperature foaming agents, such as (but not limited to): 5-Phenyl-1H-tetrazole (5-PT) or azodicarbonic acid (Azodicarbonamide) . . . etc. The nucleating agent comprises at least one of the following: calcium carbonate, silicon dioxide, calcium oxide. The practical range of the weight percentage of the added nucleating agent is 0.01%-5%, but the preferred range is 0.1%-0.5%. The weight reduction rate of the microbubbles 113 can be controlled by the amount of the foaming agent added, and the control method of the bubble size of the microbubbles 113 can be the addition of the nucleating agent and the adjustment of the process temperature. According to the content of the microbubbles 113 in the main layer 11 described in this embodiment, that is, the weight reduction rate is between 15-25% and the size is between 60-800 μm, a relatively optimal uniform light extraction effect can be achieved.

In this embodiment, the light source module is a blue light LED light source module formed by including a plurality of blue light-emitting diodes (LEDs) 92 arranged in an array on a circuit board 91. Moreover, the multilayer light diffuser plate 10 further comprises a quantum dot layer 13, a water-blocking and gas-blocking layer 14, and a plurality of microstructures 112.

As shown in FIG. 3A and FIG. 3B, a plurality of microstructures 112 are disposed on the light-emitting surface 111 of the multilayer light diffuser plate 10 in an array form. A plurality of the microstructures 112 are disposed on the top surface of the main layer 11 in an array form, and a plurality of convex portions and a plurality of concave portions are formed on the top surface of the main layer 11 by means of the microstructures 112. The plurality of the concave portions is separated by the plurality of the convex portions, so the concave portions are independent and do not communicate with each other. The quantum dot layer 13 is disposed at the plurality of concave portions on the top surface (light-emitting surface) of the main layer 11 of the light diffuser plate 10 in such a manner that, the quantum dot layer 13 is not provided at the tops of the plurality of convex portions. The thickness of the quantum dot layer 13 is t1, the distance from a top of the convex portions to a bottom of the concave portions is t2, wherein t1<t2. In other words, the height t2 of the convex portion of the microstructure 112 is larger than the thickness t1 of the quantum dot layer 13. The separated portions of the quantum dot layer 13 located in different concave portions are not connected to each other. The water-blocking and gas-blocking layer 14 is disposed on the entire upper surface of the light-emitting surface 111 of the light diffuser plate 10 and is closely adhered to cover the plurality of convex portions and the separated portions of the quantum dot layer 13. The water-blocking and gas-blocking layer 14 can isolate and avoid the external moisture and oxygen from invading the upper surface of the separated portions of the quantum dot layer 13. The thickness of the water-blocking and gas-blocking layer 14 is t3. The water-blocking and gas-blocking layer 14 can be selected from existing commercially available water-blocking and gas-blocking films, which is directly attached on the convex portions of the microstructures 112 and quantum dot layer 13 on the top surface of the light diffuser plate 10. The distance between two adjacent convex portions is d2.

In the present invention, the microstructures 112 include a plurality of N-sided pyramids, wherein N is a positive integer greater than or equal to three. In addition, the microstructures can be composed of a single shape of pyramid, or a combination of two or more different shapes of pyramids. The shape of the pyramid varies with the shape of its bottom, and the name is different, and it depends on the polygon of the bottom. For example, a pyramid with a triangular bottom is called a triangular pyramid, a pyramid with a square bottom is called a square pyramid, etc., A pyramid with an N-sided bottom as its base has N+1 vertices, N+1 faces, and 2N edges. The dual polyhedron of a pyramid is a pyramid of the same shape, for example, the dual polyhedron of a square pyramid is an inverted square pyramid. As shown in FIG. 3B, each one of the microstructures 112 presents a quadrangular pyramid (N=4) at its bottom side, that is, a square pyramid or a pyramid-shaped pyramid, in a top view. In this embodiment, the applicable range of the thickness t1 of the quantum dot layer 13 is 5-150 μm, but the preferred implementation range of t1 is 10-40 μm. The applicable range of the distance t2 between the tops of the convex portions and the bottoms of the concave portions (or the height of the convex portions) is 6-200 μm, but the preferred implementation range of t2 is 25-50 μm. In addition, t1<t2. The applicable range of the thickness t3 of the water-blocking and gas-blocking layer 14 is 5-100 μm, but the preferred range of t3 is 10-30 μm. The maximum width of the convex portions is between 50-500 μm. The applicable range of the distance d2 between the two adjacent convex portions is between 50-1000 μm, but the preferred implementation range of d2 is 250-500 μm. The blue LED light source module is a sub-millimeter light-emitting diode (Mini LED) array module capable of emitting blue light; the wavelength of the blue light is between 430-500 nm.

In this embodiment, the quantum dot layer 13 comprises a plurality of quantum dots 131 (QD for short). The quantum dots 131 can be selected from existing commercially available nanocrystal semiconductor materials, which are composed of II-VI, III-V or IV-VI group elements. The grain diameter of each of the quantum dots 131 is between 2 nm and 10 nm. Wherein, the light emission wavelengths of the plurality of quantum dots 131 in the quantum dot layer 13 may be between 490 nm and 650 nm. In this embodiment, the plurality of quantum dots 131 include a plurality of green quantum dots with light emission wavelengths of 520-530 nm and a plurality of red quantum dots with light emission wavelengths of 620-630 nm. The blue light emitted upward by the light-emitting elements 92 (preferably blue Mini LEDs) can be mixed into white light after passing through the quantum dot layer 13 and emitted upward from the light-emitting surface 111 of the light diffuser plate 10. The quantum dot layer 13 needs uniform blue light intensity to convert red/green light and mix them into uniform white light. Because the light intensity in the surrounding area of the LCD display module is lower than the light intensity of the central area, it is easy to have insufficient red/green light conversion and thus result in the phenomenon of blue light at the surrounding area of the LCD display module. The multilayer light diffuser plate 10 of the present invention is formed by foam extrusion molding. The main layer 111 of the multilayer light diffuser plate 10 includes a plurality of microbubbles 113 and diffusing particles 114, the light-emitting surface 111 is arranged with a plurality of microstructures 112, and the light-incident surface 120 is provided with a unique partially-transmissive and partially-reflective layer 12; such that, the multilayer light diffuser plate 10 can provide better light diffusion, improve light intensity in the area around the display, and avoid the phenomenon of blue light and bright and dark bands (MURA).

Figure 4:
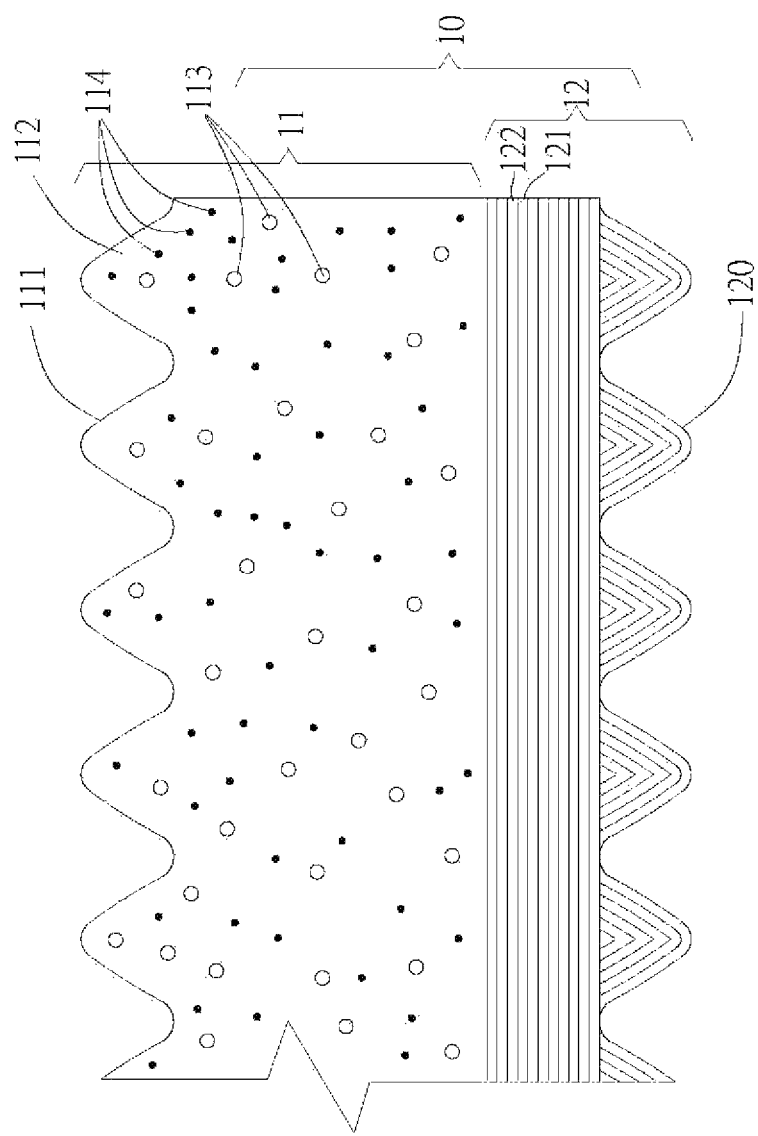
FIG. 4 is a partially enlarged schematic side view of yet another preferred embodiment of the multilayer light diffuser plate of the present invention.

Please refer to FIG. 4, which is a partially enlarged schematic side view of yet another preferred embodiment of the multilayer light diffuser plate of the present invention. As shown in FIG. 4, the multilayer light diffuser plate 10 of this preferred embodiment also includes: a main layer 11, a light-emitting surface 111 located on the top surface of the main layer 11, a partially-transmissive and partially-reflective layer 12, and a light-incident surface 120 located on the bottom surface of the light incident surface 12. The partially-transmissive and partially-reflective layer 12 also includes at least 50 or more (preferably at least 100 or more) alternately stacked first base material layers 121 and second base material layers 122. The difference between the present preferred embodiment and the embodiment previously shown in FIG. 1 and FIG. 2 is that, in the present preferred embodiment shown in FIG. 4, both the light-incident surface 120 and the light-emitting surface 111 of the multilayer light diffuser plate 10 are furnished with a plurality of the microstructures 112. The microstructures 112 are arranged on both the light-incident surface 120 and the light-emitting surface 111 of the multilayer light diffuser plate 10 in the form of an array. The microstructures 112 respectively form a plurality of convex portions and a plurality of concave portions on both the light-incident surface 120 and the light-emitting surface 111 of the multilayer light diffuser plate 10. In addition, the main layer 111 includes a plurality of microbubbles 113 and a plurality of diffusing particles 114. The partially-transmissive and partially-reflective layer 12 located on the light-incident surface 120 co-works with the microbubbles 113 and diffusing particles 114 contained in the main layer 111, and the microstructures 112 disposed on both the light-incident surface 120 and the light-emitting surface 111, which can provide relatively optimal light diffusion effect. When the multilayer light diffuser plate 10 of the present invention is used with a white LED light source module, or, although it is used with a blue LED light source module, but an additional quantum dot film is provided or a light color conversion material or a phosphor powder is added to the main layer, the multilayer light diffuser plate 10 itself does not need to be provided with a quantum dot layer.

Figure 5:
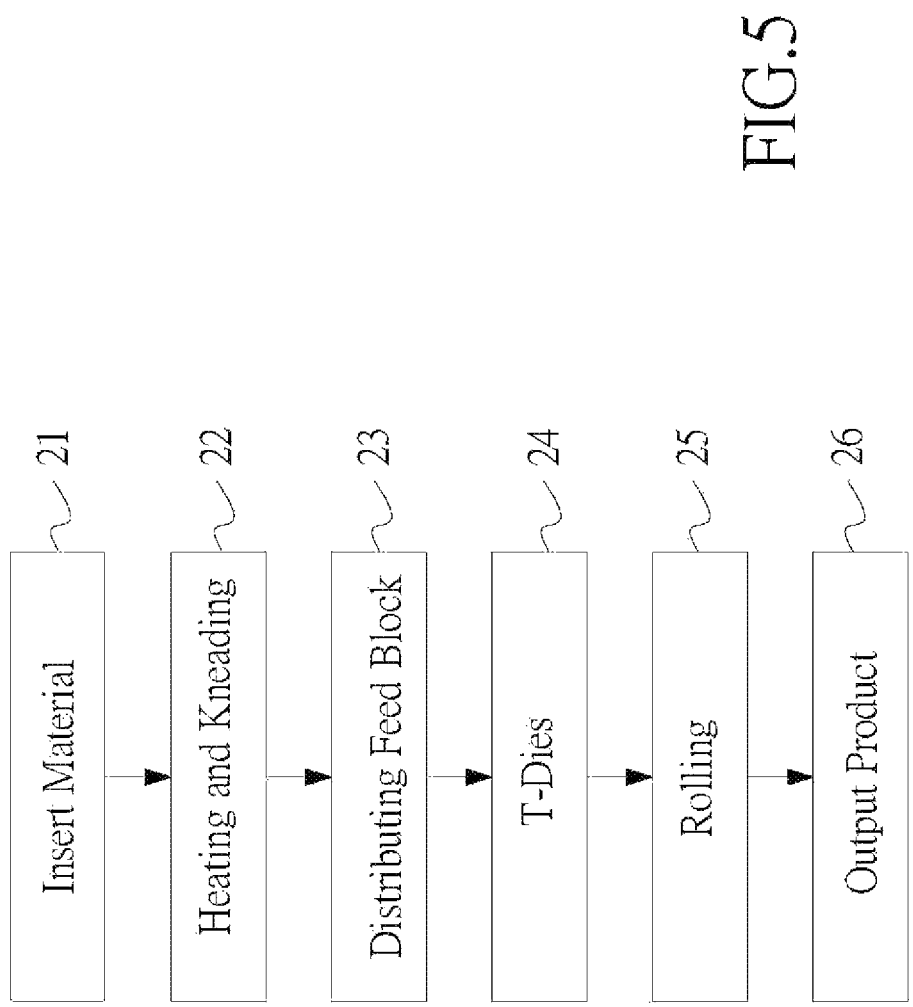
FIG. 5 is a flow chart of a preferred embodiment of the method for manufacturing the multilayer light diffuser plate of the present invention.

Please refer to FIG. 5, which is a flow chart of a preferred embodiment of the method for manufacturing the multilayer light diffuser plate of the present invention. In this embodiment, the manufacturing process of the multilayer light diffuser plate comprises the following steps:

Step 21: insert material; at least a first base material, a second base material, a foaming agent, and a plurality of diffusing particles are put into a foam extrusion molding machine from a feeding port in order to manufacture a multilayer light diffuser plate; wherein the first base material and the second base material have different refractive indices;

Step 22: heating and kneading; in the foam extrusion molding machine, the inserted materials are uniformly heated, kneaded and foamed at a general processing temperature suitable for polycarbonate; wherein the first base material and the second base material are separately heated and kneaded without mixing;

Step 23: distributing feed block; the heated and kneaded first base material and the heated and kneaded second base material are directed to a distributing feed block; by using the distributing feed block, the heated and kneaded first base material is split into a main layer and a plurality of first base material layers, and the heated and kneaded second base material is split into a plurality of second base material layers, and a plurality of the first base material layers and a plurality of the second base material layers are alternately stacked to form a partially-transmissive and partially-reflective layer, and moreover, and the partially-transmissive and partially-reflective layer is superimposed on the main layer;

Step 24: T-Dies; through a T-die of the foam extrusion molding machine, the uniformly kneaded, foamed and superimposed main layer and the partially-transmissive and partially-reflective layer from the distributing feed block are co-extruded into a one-piece multilayer plastic plate;

Step 25: rolling; the one-piece multilayer plastic plate is rolled and cooled through a roller module; in the rolling step 25, the roller module rolls on the one-piece multilayer plastic plate in order to form a plurality of microstructures on a light-emitting surface of the multilayer light diffuser plate, so that the microstructures are arranged on the light-emitting surface of the multilayer light diffuser plate in an array form; the microstructures form a plurality of convex portions and a plurality of concave portions on the light-emitting surface of the multilayer light diffuser plate; a plurality of the concave portions are separated by a plurality of the convex portions, so the plurality of the concave portions are independent and do not communicate with each other;

Step 26: output product; the cooled multilayer light diffuser plate is sent out from a discharge port of the foam extrusion molding machine.

Wherein, the multilayer light diffuser plate sent out from the discharge port has a light-incident surface and a light-emitting surface that are parallel to each other, and a thickness that is perpendicular to the light-incident surface and the light-emitting surface; in addition, the multilayer light diffuser plate comprises the main layer and the partially-transmissive and partially-reflective layer; the light-emitting surface is located on a top surface of the main layer, the partially-transmissive and partially-reflective layer is located below the main layer, and the light-incident surface is located on a bottom surface of the partially-transmissive and partially-reflective layer. The partially-transmissive and partially-reflective layer is composed of a plurality of the first base material layers and a plurality of the second base material layers stacked alternately. At least one of the upper and lower sides of each of the first base material layers is adjacent to one of the second base material layers; in addition, at least one of the upper and lower sides of each of the second base material layers is adjacent to one of the first base material layers. Materials constituting the first base material layers and the second base material layers have different refractive indices. That is, the refractive index of the first base material layers and the refractive index of the second base material layers are different.

In a preferred embodiment, the following steps are further included between the rolling step 25 and the output product step 26: coating a quantum dot layer on a plurality of the concave portions on the light-emitting surface of the multilayer light diffuser plate by a coating process. The thickness of the quantum dot layer is t1, the distance from a top of the convex portions to a bottom of the concave portions is t2, wherein t1<t2. In other words, the height t2 of the convex portion of the microstructure is larger than the thickness t1 of the quantum dot layer. The separated portions of the quantum dot layer located in different concave portions are not connected to each other. And then, through a sticking process, a water-blocking and gas-blocking layer is attached to the light-emitting surface of the multilayer light diffuser plate and covers the convex portions and the quantum dot layer. Wherein, the quantum dot layer includes a plurality of quantum dots (QD for short). The multilayer light diffuser plate is used with a blue light source module. The blue light source module is a blue light submillimeter light-emitting diode light source module composed of a plurality of blue light submillimeter light-emitting diodes (Mini LEDs) arranged in an array.

The applicant has prepared several different samples of light diffuser plates (that is, Comparative Examples 1 to 3 of the prior art and Embodiment 1 of the present invention as shown in Table 1 below); wherein each of them is applied with different light diffusion technologies such as "diffusing particles", "surface microstructures" and/or "partially-transmissive and partially-reflective layer", respectively. Then, the applicant observed the optical effects such as "light diffuser plate transmittance", "brightness" and "optical taste (5 is the best, 1 is the lowest)" of each light diffuser plate samples assembled with a light source module. The test results are listed in Table 1 below. Among them, only the light diffuser plate of Embodiment 1 has employed with the technology of providing a partially-transmissive and partially-reflective layer on the light-incident surface of the light diffuser plate according to the present invention, and the other Comparative Examples 1 to 3 do not have the partially-transmissive and partially-reflective layer. It is notable that, the specific structure of the light diffuser plate of Embodiment 1 can be directly referred to the structure of the multilayer light diffuser plate 10 shown in FIG. 1 and FIG. 2; wherein, the multilayer light diffuser plate does not contain "diffusing particles" and "surface microstructures". As can be seen from Table 1, because Embodiment 1 uses the technology and structure of the present invention of "arranging a partially-transmissive and partially-reflective layer on the light-incident surface of the light diffuser plate", so even if Embodiment 1 does not include "diffusing particles" and "surface microstructures", Embodiment 1 still has the relatively best optical performance of brightness and taste, and relatively better optical performance of transmittance, in comparison with other light diffuser plates that only use "diffusing particles" or/and "surface microstructures" (Comparative Examples 1 to 3).

TABLE 1

The comparison table of optical performances
between the light diffuser plate provided with a partially-transmissive and
partially-reflective layer of the present invention and other conventional
light diffusing technologies.

| | Amount of diffusing particles added | With or without surface microstructures | transmittance of diffuser plate | Distance between diffuser plate and LEDs | Brightness | Taste |
|---|---|---|---|---|---|---|
| Comparative Example 1 | 5% | NA | 45% | 2 mm | 100% | 2 |
| Comparative Example 2 | NA | YES | 75% | 2 mm | 110% | 3 |
| Comparative Example 3 | 5% | YES | 44% | 2 mm | 108% | 3 |
| Embodiment 1 | NA | NA | 47% | 2 mm | 110% | 4 |

NA = not any

Please refer to the following Table 2, which is a comparison table similar to Table 1, except that, in addition to the Embodiment 1 that is provided with a partially-transmissive and partially-reflective layer on the light-incident surface of the light diffuser plate without diffusing particles nor surface microstructures, Embodiment 2 and Embodiment 3 are further included in the Table 2; moreover, in the test, the distance between the diffuser plate and the LEDs is reduced to 0 mm. Among them, in Embodiment 2, a partially-transmissive and partially-reflective layer is also provided on the light-incident surface of the light diffuser plate, and 2% diffusing particles are added, but no surface microstructure is provided. In Embodiment 3, a partially-transmissive and partially-reflective layer is also arranged on the light-incident surface of the light diffuser plate, and 2% diffusion particles are added, and a plurality of surface microstructures are also arranged. Comparative Examples 1 to 3 in Table 2 have the same structures as those shown in Table 1. It can be seen from Table 2 that, not only the optical performances (brightness and taste) of Embodiments 1 to 3 of the light diffuser plate using the technology of applying the partially-transmissive and partially-reflective layer on the light-incident surface of the present invention are significantly better than that of Comparative Examples 1 to 3 that does not use the technology of the present invention, but also that, since Embodiment 3 is further applied with the technologies of adding 2% diffusing particles and furnishing surface microstructures, the optical performances of Embodiment 3 (brightness and taste) is the best of all samples, and the optical performance of transmittance of Embodiment 3 is also relatively good. In addition, it can be found from Table 2 that, when the distance between the diffuser plate and the LEDs is reduced to 0 mm, the taste of Comparative Examples 1 to 3, which do not use the technology of applying the partially-transmissive and partially-reflective layer on the light-incident surface of the present invention, will be greatly reduced; that is, the MURA problem will become very serious. In contrast, the decrease in taste of Embodiments 1 to 3 is not so obvious, and it can be seen that the technology of the present invention can provide a relatively optimal light diffusion effect. In particular, for the Embodiments 3 of the present invention (in addition to the application of the partially-transmissive and partially-reflective layer on the light-incident surface, the addition of 2% diffusing particles and the surface microstructures are also provided), even when the bottom surface of the diffuser plate is directly contacting the LEDs (that is, the distance between the diffuser plate and the LEDs is 0 mm), good optical performances of brightness, taste, and transmittance can still be achieved; such structure can greatly reduce the overall thickness of the direct-type backlight module, making the product thinner and more convenient to carry.

TABLE 2

The comparison table of optical performances
between the light diffuser plate provided with a partially-transmissive and
partially-reflective layer of the present invention and other conventional
light diffusing technologies.

| | Amount of diffusing particles added | With or without surface microstructures | transmittance of diffuser plate | Distance between diffuser plate and LEDs | Brightness | Taste |
|---|---|---|---|---|---|---|
| Comparative Example 1 | 5% | NA | 45% | 0 mm | 100% | 1 |
| Comparative Example 2 | NA | YES | 75% | 0 mm | 110% | 1 |
| Comparative Example 3 | 5% | YES | 44% | 0 mm | 108% | 1 |
| Embodiment 1 | NA | NA | 47% | 0 mm | 110% | 3 |

TABLE 2-continued

The comparison table of optical performances between the light diffuser plate provided with a partially-transmissive and partially-reflective layer of the present invention and other conventional light diffusing technologies.

| | Amount of diffusing particles added | With or without surface microstructures | transmittance of diffuser plate | Distance between diffuser plate and LEDs | Brightness | Taste |
|---|---|---|---|---|---|---|
| Embodiment 2 | 2% | NA | 47% | 0 mm | 110% | 4 |
| Embodiment 3 | 2% | YES | 50% | 0 mm | 115% | 4 |

NA = not any

Please refer to the following Table 3, which is a comparison table similar to Table 1 and Table 2, except that, the newly included Embodiment 7 and Embodiment 8 are compared with the aforementioned Comparative Example 3 in Table 3. Among them, in Embodiment 7, in addition to providing a partially-transmissive and partially-reflective layer on the light-incident surface of the light diffuser plate, foaming was performed during the heating and kneading process of the main layer of the light diffuser plate to generate microbubbles. In Embodiment 8, in addition to providing a partially-transmissive and partially-reflective layer on the light-incident surface of the light diffuser plate, and performing foaming process to generate microbubbles in the main layer, the main layer is further added with light color conversion materials that can convert blue light to white light. It can be seen from Table 3 that, the samples of Embodiment 7 and Embodiment 8 include microbubbles and light color conversion materials in the main layer of the light diffuser plate, which will only slightly reduce the light transmittance and brightness, but can further improve the taste. Even when the bottom surface of the diffuser plate is directly contacting the LEDs (that is, the distance between the diffuser plate and the LEDs is 0 mm), good optical performances of brightness and taste as well as acceptable transmittance can still be achieved; such structure can greatly reduce the overall thickness of the direct-type backlight module, making the product thinner and more convenient to carry.

TABLE 3

The comparison table of optical performances between the light diffuser plate provided with a partially-transmissive and partially-reflective layer, foaming microbubbles and color conversion materials of the present invention and other conventional light diffusing technologies.

| | Amount of diffusing particles added | With or without surface microstructures | transmittance of diffuser plate | Distance between diffuser plate and LEDs | Brightness | Taste |
|---|---|---|---|---|---|---|
| Comparative Example 3 | 5% | YES | 44% | 0 mm | 108% | 1 |
| Embodiment 7 | foaming | NA | 38% | 0 mm | 110% | 5 |
| Embodiment 8 | foaming + color conversion | YES | 40% | 0 mm | 115% | 5 |

NA = not any

Figure 6:
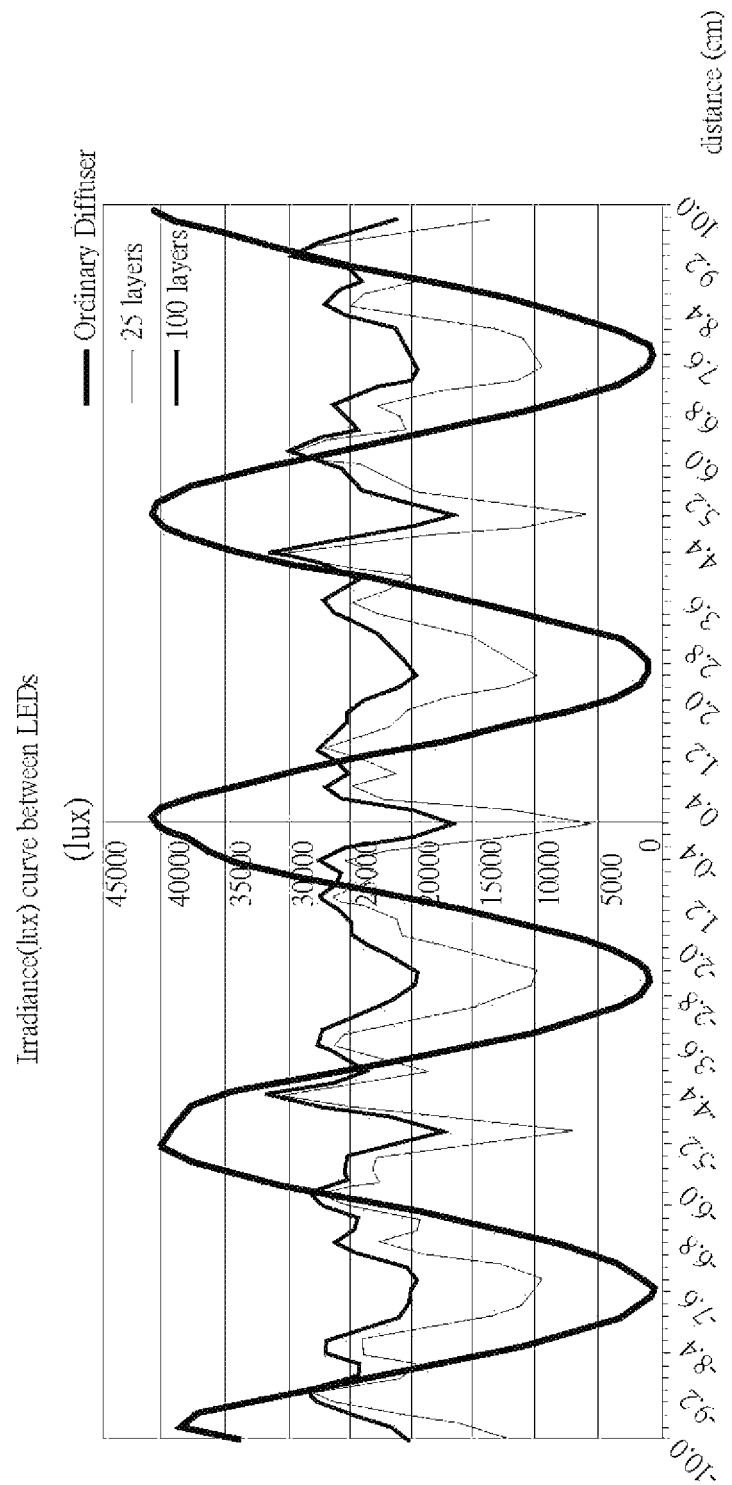
FIG. 6 is a curve diagram showing the brightness of the light emitted at different positions among the LEDs for a light diffuser plate with different numbers of layers of the partially-transmissive and partially-reflective layer.

Please refer to FIG. 6, which is a curve diagram showing the brightness of the light emitted at different positions among the LEDs for a light diffuser plate with different numbers of layers of the partially-transmissive and partially-reflective layer. Wherein, the horizontal axis of FIG. 6 is the position of the light diffuser plate in the horizontal direction (the unit of distance is cm), and the vertical axis is the illuminance value (the unit is lux). It can be seen from FIG. 6 that, the conventional diffuser plate does not have a partially-transmissive and partially-reflective layer on the light-incident surface, so the phenomenon of bright and dark bands (MURA) is extremely serious. When the light-incident surface of the diffuser plate is provided with a partially-transmissive and partially-reflective layer, the number of layers stacked with different refractive indices will affect its anti-MURA performance; as shown in FIG. 6, when the number of layers is only 25 layers, the LED bright and dark bands are still slightly obvious, but when the number of layers reaches 100 layers or above, the difference between bright and dark bands can be evened out.

Figure 7:
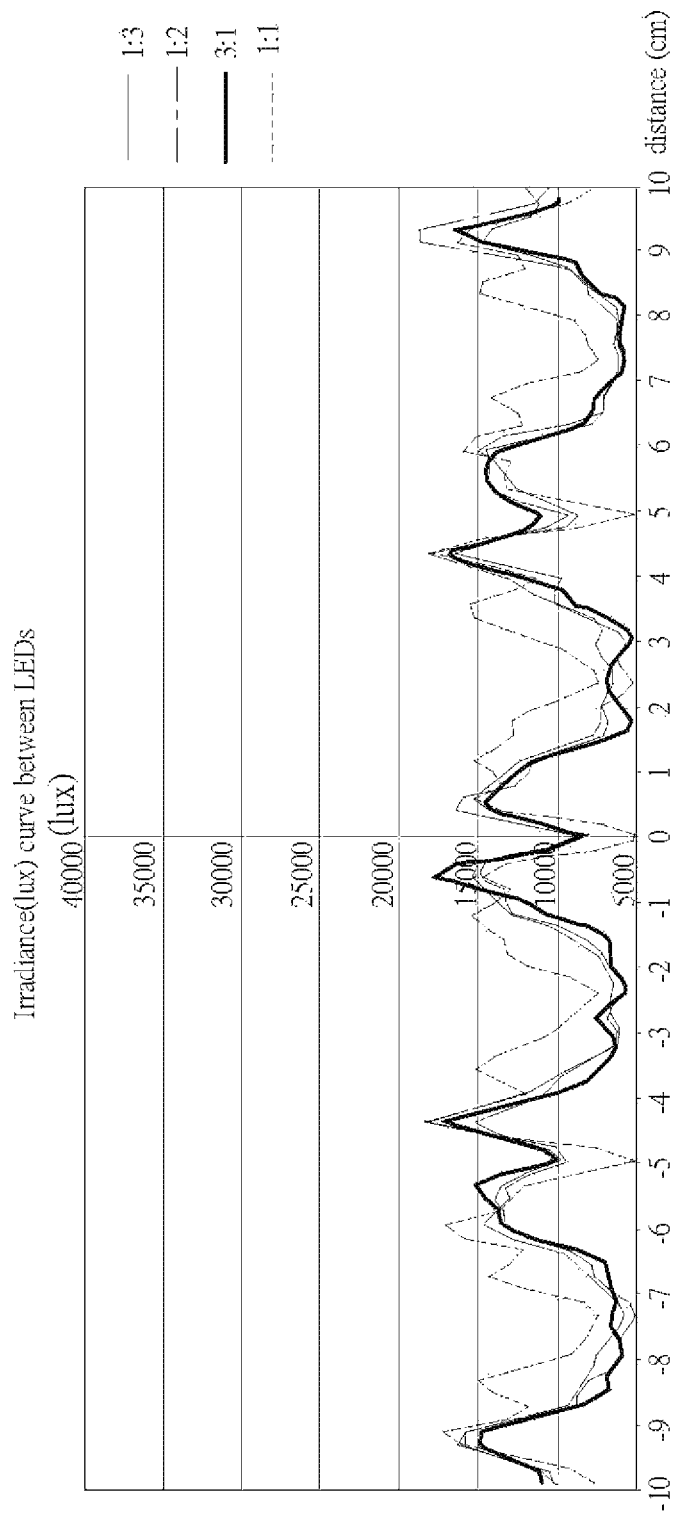
FIG. 7 is a curve diagram showing the brightness of the light emitted at different positions among the LEDs for a light diffuser plate with a partially-transmissive and partially-reflective layer having difference thickness ratio of the alternately stacked first base material layer and second base material layer.

Please refer to FIG. 7, which is a curve diagram showing the brightness of the light emitted at different positions among the LEDs for a light diffuser plate with a partially-transmissive and partially-reflective layer having difference thickness ratio of the alternately stacked first base material layer and second base material layer. Wherein, the horizontal axis of FIG. 7 is the position of the light diffuser plate in the horizontal direction (the unit of distance is cm), and the vertical axis is the illuminance value (the unit is lux). It can be seen from FIG. 7 that, when the thickness ratio of the first base material layer and the second base material layer is 1:1, a relatively optimal uniform light effect can be obtained.

Figure 8:
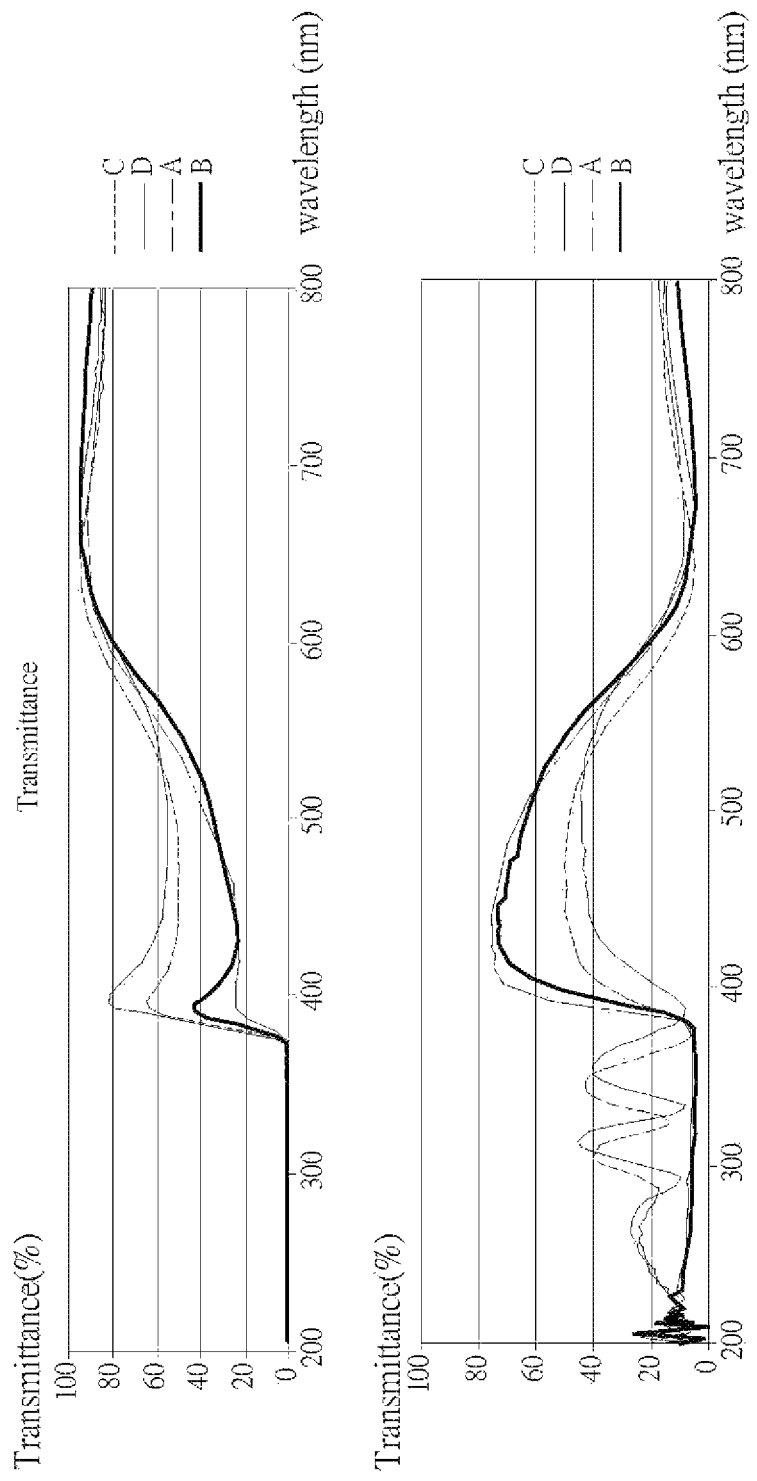
FIG. 8 is a curve diagram showing the transmittance of the partially-transmissive and partially-reflective layer at different light wavelengths according to the light diffuser plate samples A, B, C, and D which are furnished with the partially-transmissive and partially-reflective layer of the present invention.

Please refer to FIG. 8 and FIG. 9. Wherein, FIG. 8 is a curve diagram showing the transmittance of the partially-transmissive and partially-reflective layer at different light wavelengths according to the light diffuser plate samples A, B, C, and D which are furnished with the partially-transmissive and partially-reflective layer of the present invention. FIG. 9 is a comparison diagram of the tastes of samples A, B, C and D shown in FIG. 8. Wherein, the horizontal axis of FIG. 8 is the light wavelength (unit is nm), and the vertical axis is the transmittance (%). It can be seen from FIG. 8 and FIG. 9 that, for light diffuser plates furnished with a partially-transmissive and partially-reflective layer, when their transmittance for 400 nm is in the range of 30~60% and their reflectance is in the range of 60~30%, that is, the sample B and sample C, they will have the least obvious MURA problem, so they can get the best taste.

While the present invention has been particularly shown and described with reference to a preferred embodiment, it will be understood by those skilled in the art that various changes in form and detail may be without departing from the spirit and scope of the present invention.

What is claimed is:

1. A multilayer light diffuser plate capable of being assembled on a light source module; the multilayer light diffuser plate having a light-incident surface and a light-emitting surface that are parallel to each other; a distance between the light-incident surface and the light-emitting surface being a thickness of the multilayer light diffuser plate; the light-incident surface being adjacent to the light source module, so that the light emitted from the light source module can enter the multilayer light diffuser plate through the light-incident surface and travel substantially along a thickness direction; the multilayer light diffuser plate comprising:

a main layer, the light-emitting surface being located on a top surface of the main layer; and a partially-transmissive and partially-reflective layer, located below the main layer; the light-incident surface is located on a bottom surface of the partially-transmissive and partially-reflective layer;

wherein, the partially-transmissive and partially-reflective layer comprises a plurality of first base material layers and a plurality of second base material layers stacked alternately; at least one of the upper and lower sides of each of the first base material layers is adjacent to one of the second base material layers; in addition, at least one of the upper and lower sides of each of the second base material layers is adjacent to one of the first base material layers; a material constituting the first base material layers and another material constituting the second base material layers have different refractive indices;

wherein:

base materials of the main layer and the partially-transmissive and partially-reflective layer are either non-crystalline or semi-crystalline plasticized materials;

a ratio of the thickness of the main layer to the thickness of the partially-transmissive and partially-reflective layer is in the range of 9:1 to 7:3;

a number of stacked layers of the partially-transmissive and partially-reflective layer, that is, the sum of the number of layers of the first base material layers and the second base material layers, is between 50 and 400 layers;

a ratio of the thickness of the first base material layer to the thickness of the second base material layer is ranged from 3:1 to 1:3;

wherein:

the multilayer light diffuser plate further comprises a quantum dot layer and a water-blocking and gas-blocking layer; a plurality of microstructures is disposed on the light-emitting surface of the multilayer light diffuser plate in an array form; a plurality of convex portions and a plurality of concave portions are formed on the light-emitting surface by means of the microstructures; the concave portions are separated by the convex portions, so the concave portions are independent and do not communicate with each other;

the quantum dot layer is disposed at the concave portions on the light-emitting surface of the light diffuser plate; a thickness of the quantum dot layer is t1, a distance from a top of the convex portions to a bottom of the concave portions is t2, wherein t1<t2;

the water-blocking and gas-blocking layer is disposed entirely on the light-emitting surface of the light diffuser plate and is closely adhered to cover the plurality of convex portions and the quantum dot layer;

the quantum dot layer comprises a plurality of quantum dots; the quantum dots are nanocrystal semiconductor materials, which are composed of II-VI, III-V or IV-VI group elements; a grain diameter of each of the quantum dots is between 2 nm and 10 nm; wherein, the quantum dots include a plurality of green quantum dots with light emission wavelengths of 520-530 nm and a plurality of red quantum dots with light emission wavelengths of 620-630 nm;

the light source module is a blue light LED light source module formed by a plurality of blue light-emitting diodes (LEDs) arranged in an array.

2. The multilayer light diffuser plate of claim 1, wherein, the materials of the main layer and the partially-transmissive and partially-reflective layer are respectively selected from one of the following: polycarbonate (PC), polystyrene (PS), polymethyl methacrylate (PMMA, commonly known as acrylic force), polyethylene (PE), polypropylene (PP), and polyethylene terephthalate (PET);

the number of stacked layers of the partially-transmissive and partially-reflective layer is between 100 and 400 layers.

3. The multilayer light diffuser plate of claim 2, wherein, the material of the main layer is polycarbonate (PC); the material of the first base material layers is polycarbonate (PC); the material of the second base material layers is polymethyl methacrylate (PMMA);

the thicknesses of the first base material layer and the thicknesses of the second base material layer are the same, that is, the ratio of the thickness of each first base material layer to the thickness of each second base material layer 122 is 1:1;

the light source module is an LED light source module comprising a plurality of light-emitting diodes (LEDs) arranged in an array;

the thickness of the multilayer light diffuser plate ranges from 1.0 mm to 3.0 mm.

4. The multilayer light diffuser plate of claim 1, wherein, the multilayer light diffuser plate is made by foam extrusion molding, and the main layer comprises a plurality of microbubbles and a plurality of diffusing particles; a material of the diffusing particles is one of the following: calcium carbonate, silicon dioxide, titanium dioxide, silicone resin microparticles, and polymethyl methacrylate microparticles; a weight percentage of the diffusing particles in the main layer is 0.1%~10%; the microbubbles are distributed in the main layer; due to the difference in refractive indices between air in the microbubbles and the material of the main layer, light traveling in the main layer can be refracted, reflected or scattered by the microbubbles;

a weight reduction rate of the microbubbles to the main layer is 15-25%, and an average size of the microbubbles is between 60~800 µm;

wherein, a calculation formula of the weight reduction rate is:

weight reduction rate (%)=$(W1-W2)/W2*100\%$;

$W1=H*(L1*L2*D)$;

wherein:

H is the average thickness of the main layer (mm);
L1 is the length of the main layer (mm);
L2 is the width of the main layer (mm);
D is the density of the raw material of the main layer (g/mm$^3$);
W1 is the theoretical weight (g) of the main layer, that is, the weight when the microbubbles are not included;
W2 is the actual weight (g) of the main layer, that is, the actual weight of the plate body containing a plurality of the microbubbles is actually weighed by a scale.

5. The multilayer light diffuser plate of claim 1, wherein:

the microstructures include a plurality of N-sided pyramids, wherein N is a positive integer greater than or equal to three; t2 is between 6-200 µm; the maximum width of the convex portions is between 50-500 µm; a distance between two adjacent said convex portions is between 50-1000 µm;

a thickness of the water-blocking and gas-blocking layer is t3, and t3 is between 5-100 µm;

the blue light LED light source module is a sub-millimeter light-emitting diode (Mini LED) array module capable of emitting blue light; a wavelength of the blue light is between 430-500 nm.

6. The multilayer light diffuser plate of claim 1, wherein, a plurality of said microstructures is disposed on the light-incident surface of the multilayer light diffuser plate in an array form; a plurality of said convex portions and a plurality of said concave portions are formed on the light-incident surface by means of the microstructures.

7. A method for manufacturing a multilayer light diffuser plate, comprising the following steps:

a step for inserting material, wherein at least a first base material, a second base material, a foaming agent, and a plurality of diffusing particles are put into a foam extrusion molding machine from a feeding port; wherein the first base material and the second base material have different refractive indices;

a step for heating and kneading, wherein, in the foam extrusion molding machine, the inserted materials are uniformly heated, kneaded and foamed at a general processing temperature suitable for polycarbonate; wherein the first base material and the second base material are separately heated and kneaded without mixing;

a step for distributing feed block, wherein, the heated and kneaded first base material and the heated and kneaded second base material are directed to a distributing feed block; by using the distributing feed block, the heated and kneaded first base material is split into a main layer and a plurality of first base material layers, and the heated and kneaded second base material is split into a plurality of second base material layers, and the first base material layers and the second base material layers are alternately stacked to form a partially-transmissive and partially-reflective layer, and moreover, and the partially-transmissive and partially-reflective layer is superimposed on the main layer;

a step for T-Dies, wherein, through a T-die of the foam extrusion molding machine, the uniformly kneaded, foamed and superimposed main layer and the partially-transmissive and partially-reflective layer from the distributing feed block are co-extruded into a one-piece multilayer plastic plate;

a step for rolling, wherein, the one-piece multilayer plastic plate is rolled and cooled through a roller module; and a step for output product, wherein the cooled one-piece multilayer plastic plate is sent out from a discharge port of the foam extrusion molding machine as a product of multilayer light diffuser plate;

wherein the multilayer light diffuser plate sent out from the discharge port has a light-incident surface and a light-emitting surface that are parallel to each other, and a thickness that is perpendicular to the light-incident surface and the light-emitting surface; in addition, the multilayer light diffuser plate comprises the main layer and the partially-transmissive and partially-reflective layer; the light-emitting surface is located on a top surface of the main layer, the partially-transmissive and partially-reflective layer is located below the main layer, and the light-incident surface is located on a bottom surface of the partially-transmissive and partially-reflective layer;

wherein the partially-transmissive and partially-reflective layer comprises the first base material layers and the second base material layers stacked alternately; at least one of the upper and lower sides of each of the first base material layers is adjacent to one of the second base material layers; in addition, at least one of the upper and lower sides of each of the second base material layers is adjacent to one of the first base material layers; a material constituting the first base material layers and another material constituting the second base material layers have different refractive indices.

8. The method for manufacturing a multilayer light diffuser plate of claim 7, wherein,
base materials of the main layer and the partially-transmissive and partially-reflective layer are either non-crystalline or semi-crystalline plasticized materials;
a ratio of the thickness of the main layer to the thickness of the partially-transmissive and partially-reflective layer is in the range of 9:1 to 7:3;
a number of stacked layers of the partially-transmissive and partially-reflective layer, that is, the sum of the number of layers of the first base material layers and the second base material layers, is between 50 and 400 layers;
a ratio of the thickness of the first base material layer to the thickness of the second base material layer is ranged from 3:1 to 1:3.

9. The method for manufacturing a multilayer light diffuser plate of claim 8, wherein,
the materials of the main layer and the partially-transmissive and partially-reflective layer are respectively selected from one of the following: polycarbonate (PC), polystyrene (PS), polymethyl methacrylate (PMMA, commonly known as acrylic force), polyethylene (PE), polypropylene (PP), and polyethylene terephthalate (PET);
the number of stacked layers of the partially-transmissive and partially-reflective layer is between 100 and 400 layers.

10. The method for manufacturing a multilayer light diffuser plate of claim 9, wherein,
the material of the main layer is polycarbonate (PC); the material of the first base material layers is polycarbonate (PC); the material of the second base material layers is polymethyl methacrylate (PMMA);
the thicknesses of the first base material layer and the thicknesses of the second base material layer are the same, that is, the ratio of the thickness of each first base material layer to the thickness of each second base material layer 122 is 1:1;
the thickness of the multilayer light diffuser plate ranges from 1.0 mm to 3.0 mm.

11. The method for manufacturing a multilayer light diffuser plate of claim 8, wherein,
the multilayer light diffuser plate is made by foam extrusion molding, and the main layer comprises a plurality of microbubbles and a plurality of diffusing particles; a material of the diffusing particles is one of the following: calcium carbonate, silicon dioxide, titanium dioxide, silicone resin microparticles, and polymethyl methacrylate microparticles; a weight percentage of the diffusing particles in the main layer is 0.1%~10%; the microbubbles are distributed in the main layer; due to the difference in refractive indices between air in the microbubbles and the material of the main layer, light traveling in the main layer can be refracted, reflected or scattered by the microbubbles;
a weight reduction rate of the microbubbles to the main layer is 15-25%, and an average size of the microbubbles is between 60~800 μm;
wherein, a calculation formula of the weight reduction rate is:

weight reduction rate (%)=($W1-W2$)/$W2$*100%;

$W1=H*(L1*L2*D)$;

wherein:
H is the average thickness of the main layer (mm);
L1 is the length of the main layer (mm);
L2 is the width of the main layer (mm);
D is the density of the raw material of the main layer (g/mm$^3$);
W1 is the theoretical weight (g) of the main layer, that is, the weight when the microbubbles are not included;
W2 is the actual weight (g) of the main layer, that is, the actual weight of the plate body containing a plurality of the microbubbles is actually weighed by a scale.

12. The method for manufacturing a multilayer light diffuser plate of claim 8, wherein, in the step for rolling, the roller module rolls on the one-piece multilayer plastic plate in order to form a plurality of microstructures on a light-emitting surface of the one-piece multilayer plastic plate, so that the microstructures are arranged on the light-emitting surface in an array form; the microstructures form a plurality of convex portions and a plurality of concave portions on the light-emitting surface; the concave portions are separated by the convex portions, so the concave portions are independent and do not communicate with each other;
wherein, the following steps are further after the step for rolling:
a step for coating a quantum dot layer on the concave portions on the light-emitting surface of the multilayer light diffuser plate by a coating process; a thickness of the quantum dot layer is t1, a distance from a top of the convex portions to a bottom of the concave portions is t2, wherein t1<t2; and
a step for sticking a water-blocking and gas-blocking layer onto the light-emitting surface of the multilayer light diffuser plate in order to cover the convex portions and the quantum dot layer;
wherein, the quantum dot layer includes a plurality of quantum dots (QD for short); the multilayer light diffuser plate is used with a blue light source module; the blue light source module is a blue light submillimeter light-emitting diode light source module comprises a plurality of blue light submillimeter light-emitting diodes (Mini LEDs) arranged in an array.

13. The method for manufacturing a multilayer light diffuser plate of claim 12, wherein,
the quantum dots are nanocrystal semiconductor materials, which are composed of II-VI, III-V or IV-VI group elements; a grain diameter of each of the quantum dots is between 2 nm and 10 nm; wherein, the quantum dots include a plurality of green quantum dots with light emission wavelengths of 520-530 nm and a plurality of red quantum dots with light emission wavelengths of 620-630 nm;
the microstructures include a plurality of N-sided pyramids, wherein N is a positive integer greater than or equal to three; t2 is between 6-200 μm; the maximum width of the convex portions is between 50-500 μm; a distance between two adjacent said convex portions is between 50-1000 μm;

a thickness of the water-blocking and gas-blocking layer is t3, and t3 is between 5-100 μm;

a wavelength of the blue light emitted by the blue light Mini LEDs is between 430-500 nm.

14. The method for manufacturing a multilayer light diffuser plate of claim 12, wherein, a plurality of said microstructures is disposed on the light-incident surface of the multilayer light diffuser plate in an array form; a plurality of said convex portions and a plurality of said concave portions are formed on the light-incident surface by means of the microstructures.

* * * * *